(12) United States Patent
Eleveld et al.

(10) Patent No.: US 7,060,647 B2
(45) Date of Patent: Jun. 13, 2006

(54) DOUBLE METAL COMPLEX CATALYST

(75) Inventors: Michiel Barend Eleveld, Amsterdam (NL); Johan Paul Smit, Amsterdam (NL); Robert Adrianus Wilhelmus Grotenbreg, Amsterdam (NL); Riemer Alberts De Groot, Amsterdam (NL)

(73) Assignee: Shell Oil Company, Houston, TX (US)

( * ) Notice: Subject to any disclaimer, the term of this patent is extended or adjusted under 35 U.S.C. 154(b) by 181 days.

(21) Appl. No.: 10/460,729

(22) Filed: Jun. 12, 2003

(65) Prior Publication Data

US 2003/0212246 A1    Nov. 13, 2003

Related U.S. Application Data

(62) Division of application No. 09/944,820, filed on Aug. 31, 2001, now Pat. No. 6,596,842.

(30) Foreign Application Priority Data

Jul. 16, 2001   (EP)   .................................. 01306107

(51) Int. Cl.
   *B01J 37/34*   (2006.01)
   *C08G 65/12*   (2006.01)
   *D01J 31/18*   (2006.01)

(52) U.S. Cl. ..................... 502/175; 502/104; 502/111; 528/412

(58) Field of Classification Search ................ 502/175, 502/200; 528/421
   See application file for complete search history.

(56) References Cited

U.S. PATENT DOCUMENTS 6,018,017 A    1/2000   Le-Khac ..................... 528/421

FOREIGN PATENT DOCUMENTS

| JP | 4-145123 | 5/1992 |
|---|---|---|
| RU | 2102136 | 1/1998 |
| RU | 2102136 C1 | 1/1998 |
| WO | 02/068502 | 9/2002 |
| WO | 02/068503 | 9/2002 |
| WO | WO 03/008482 | 1/2003 |

OTHER PUBLICATIONS

Tilley and Thumm, Physics for College Students, Alternate Edition, Cummings Publishing Company, Reading, Massachusetts, 1974 and 1976, p. 524, Figure 14-2, the electromagnetic spectrum.*
Sound Basics, one page, Feb. 17, 2006.*

* cited by examiner

*Primary Examiner*—Robert Sellers

(57) ABSTRACT

Process comprising treating a double metal cyanide complex catalyst with sound waves and/or electromagnetic radiation, process for polymerising alkylene oxide in which such catalyst is used, and double metal cyanide complex catalyst which catalyst has been treated with sound waves and/or electromagnetic radiation.

10 Claims, No Drawings

US 7,060,647 B2

DOUBLE METAL COMPLEX CATALYST

CROSS-REFERENCE TO RELATED APPLICATION

This application is a divisional of patent application Ser. No. 09/944,820, filed Aug. 31, 2001, which is now U.S. Pat. No. 6,596,842.

The present invention relates to a process for polymerization alkylene oxides with the help of a double metal cyanide complex catalyst, to a process for treating double metal cyanide complex catalyst and to a double metal cyanide complex catalyst per se.

BACKGROUND OF THE INVENTION

Double metal cyanide (DMC) compounds are well known catalysts for epoxide polymerization, i.e. for polymerizing alkylene oxides like propylene oxide and ethylene oxide to yield poly(alkylene oxide) polymers, also referred to as polyether polyols. The catalysts are highly active, and give polyether polyols that have low unsaturation compared with similar polyols made using strong basic catalysts like potassium hydroxide. Besides for the preparation of polyether polyols the catalysts can be used to make a variety of polymer products, including polyester polyols and polyetherester polyols. The polyols can be used for preparing polyurethanes by reacting them with polyisocyanates under appropriate conditions. Polyurethane products that can be made include polyurethane coatings, elastomers, sealants, foams, and adhesives.

Although highly active catalysts can be prepared with the help of the prior art processes, there still is interest in increasing the activity further.

SUMMARY OF THE INVENTION

It has now surprisingly been found that the activity of DMC catalysts can be increased further by treating the catalyst with sound waves and/or electromagnetic radiation.

Therefore, the present invention relates to a process for polymerization of alkylene oxides, which process comprises polymerising alkylene oxide in the presence of a double metal cyanide complex catalyst and a hydroxyl group-containing initiator, at least part of which double metal cyanide complex catalyst has been treated with sound waves and/or electromagnetic radiation.

Further, the present invention relates to a process comprising treating a double metal cyanide complex catalyst with sound waves and/or electromagnetic radiation, and to a catalyst containing a double metal cyanide complex, which catalyst has been treated with sound waves and/or electromagnetic radiation.

Sound waves include not only waves having a frequency which can be heard, but also waves having either a higher or a lower frequency.

DETAILED DESCRIPTION OF THE INVENTION

As mentioned above, DMC catalysts are well known in the art. It has been found that in principle any DMC catalyst can be used in the present invention.

Generally, DMC catalysts prepared according to the prior art and suitable for use in polymerization of alkylene oxides, exhibits a powder x-ray diffraction pattern exhibiting no detectable signals corresponding to highly crystalline zinc hexacyanocobaltate at about (d-spacing, angstroms) 5.07. More specifically, such DMC catalysts generally exhibit a powder x-ray diffraction pattern of (d-spacing, angstroms): 4.82 (br), 3.76 (br) and exhibits no detectable signals corresponding to highly crystalline zinc hexacyanocobaltate at about (d-spacing, angstroms): 5.07, 3.59, 2.54 and 2.28.

A process by which the DMC catalyst for use in the present invention can be prepared, has been described in Japanese application 4-145123. The catalyst which is prepared is a bimetallic cyanide complex having tertiary butanol coordinated as organic ligand. The bimetallic cyanide complex catalyst is prepared by mixing together aqueous solutions, or solutions in water and organic solvent mixtures, of a metal salt, preferably a salt of Zn(II) or Fe(II), and a polycyanometallate (salt), preferably containing Fe(III) or Co(III), and bringing tertiary butanol into contact with the bimetallic cyanide complex so obtained and removing the surplus solvent and tertiary butanol. In Reference Example 1, the surplus solvent and tertiary butanol are removed by suction filtration. The filter-cake obtained is washed with a 30% wt tertiary butanol aqueous solution and filtered, and this procedure is repeated with 100% t-butanol. The filter cake is dried at 40° C. under reduced pressure and then pulverized.

Another process by which the DMC catalyst for use in the present invention can be made, has been described in EP-A-555053. EP-A-555053 describes a process in which the DMC catalysts are prepared by (a) adding an aqueous solution of at least 100% stoichiometric excess of a first metal salt to an aqueous solution of an alkali metal cyanometallate while maintaining the temperature of the latter in the range 30 to 75° C., and in which either or both the first and the second aqueous solutions contain a water-miscible heteroatom-containing organic ligand selected from alcohols, aldehydes, ketones, ethers, esters, ureas, amides, nitrites and sulphides, to form an aqueous slurry of particulate metal cyanide complex catalyst; and (b) combining the aqueous slurry with a second water-miscible heteroatom-containing organic ligand, which may be the same as or different from the first organic ligand and is selected from alcohols, aldehydes, ketones, ethers, esters, amides, ureas, nitrites, or sulphides, said combining step being optional unless neither the first nor the second aqueous solution contained any water-miscible heteroatom-containing organic ligand; and (c) recovering the particulate metal cyanide complex catalyst from the aqueous slurry by filtration.

Another process by which the DMC catalyst can be prepared, has been described in PCT patent application PCT/EP01/03498 by Shell. The process described comprises the steps of (a) combining an aqueous solution of a metal salt with an aqueous solution of a metal cyanide salt and reacting these solutions, wherein at least part of this reaction takes place in the presence of an organic complexing agent, thereby forming a dispersion of a solid DMC complex in an aqueous medium;

(b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;

(c) removing the first aqueous layer; and (d) recovering the DMC catalyst from the layer containing the DMC catalyst.

Preferably, the extracting liquid used comprises a compound of the general formula (I):

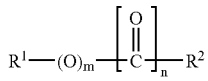

wherein:
R¹ represents hydrogen, an aryl group, a substituted or unsubstituted C1–C10 alkyl group or a group R³—NH—,
R² represents hydrogen, an optionally halogenated C₁–C₁₀ alkyl group, a group R³—NH—, a group —R⁴—C(O)O—R⁵ or a cyanide group,
R³ represents hydrogen or a C₁–C₁₀ alkyl group,
R⁴ represents a substituted or unsubstituted alkylene group having 2 to 15 carbon atoms,
R⁵ represents hydrogen, a substituted or unsubstituted C₁–C₁₀ alkyl group, and
n and m independently are 0 or 1.

Most preferred extracting liquids are 2-butyl-2-ethyl-1,3-propanediol, methyl tert-butyl ether, ethyl formiate, ethyl acetate, ethyl-2-ethyl-3-methyl butanoate, di-ethyl malonate, di-ethyl-2-cyclohexyl-2-propyl malonate, heptane, benzonitrile, pivalonitrile (tert-butylnitrile), butyl carbamate, dibutyl carbate and propyl carbamate, dichloromethane, 1,2-dichloroethane and tetrachloroethane.

Typically, the DMC catalyst according to PCT patent application PCT/EP01/03498 will have the formula

wherein C is the ligand used and A is the compound of general formula (I) used. Preferably, C is tert-butyl alcohol and A is methyl tert-butyl ether, di-ethyl ether, di-isopropyl ether, tert-amyl methyl ether or di-butyl ether. Preferably, n is of from 0 to 10, m is of from 0 to 20 and p is of from 0 to 10.

In DMC catalyst preparation processes in general, and more specifically in the DMC catalyst preparation processes mentioned above, a metal salt solution is combined with a metal cyanide salt solution.

Suitable metal salts and metal cyanide salts which can be used in DMC preparation processes in general comprise water-soluble salts suitably having the formula M(X)n, in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). Examples of suitable metal salts include zinc chloride, zinc bromide, zinc acetate, zinc acetonylacetate, zinc benzoate, zinc nitrate, iron(II) chloride, iron(II) sulphate, iron(II) bromide, cobalt(II) chloride, cobalt(II) thiocyanate, nickel(II) formate, nickel(II) nitrate, and the like, and mixtures thereof. Zinc halides, and particularly zinc chloride, are preferred.

The metal cyanide salt which can be used in any of the above processes is a water-soluble metal cyanide salt preferably having the general formula (Y)ₐM'(CN)ᵦ(A)꜀ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). Suitable water-soluble metal cyanide salts include, for instance, potassium hexacyanocobaltate(III), potassium hexacyanoferrate(II), potassium hexacyanoferrate(III), calcium hexacyanocobaltate(III) and lithium hexacyano-iridate(III).

Preferred ligands or complexing agents for use in any of the above processes are ethers like dimethoxyethane and diglyme and water-soluble aliphatic alcohols, such as ethanol, isopropyl alcohol, n-butyl alcohol (1-butanol), isobutyl alcohol (2-methyl-1-propanol), sec-butyl alcohol (2-butanol), and tert-butyl alcohol (2-methyl-2-propanol). Of these, dimethoxyethane and tert-butyl alcohol are most preferred.

Combining both aqueous reactant streams may be conducted by conventional mixing techniques including mechanical stirring and ultrasonic mixing.

After the reaction has taken place and a DMC compound has been formed the DMC compound can be separated in various ways. As is described in the patent specifications discussed hereinbefore, such recovery procedure will normally involve mixing the DMC catalyst with complexing agent and ligand, optionally in admixture with water, and separating DMC catalyst and complexing agent/ligand/water again, e.g. by filtration, centrifugation/decantation or flashing. This procedure may be repeated one or more times. Eventually, the catalyst is dried and recovered as a solid. The final solid catalyst can also be recovered as a composition also containing polyether. Such separation methods have been described in more detail in WO-A-97/40086 and EP-A-700949.

Further details are described in each of the documents mentioned above.

Generally, the DMC catalyst used in polymerization of alkylene oxides is a catalyst containing hexacyanocobaltate.

In the present process for polymerization of alkylene oxides, at least part of the DMC catalyst which is used for polymerization of alkylene oxides, has been treated with sound waves and/or electromagnetic radiation.

It is possible to treat only part of the catalyst for use in the polymerization process, with sound waves and/or electromagnetic radiation. However, in order to have the full benefit of the present invention, it is preferred that all catalyst is treated.

Without wishing to be bound to any theory, it is thought that the higher catalyst activity observed in the present invention, is caused by the fact that the energy supplied by the sound waves and/or electromagnetic radiation makes the active sites of the DMC catalyst more accessible.

In principle any kind of sound waves and/or electromagnetic radiation can be used in the process of the present invention. It will be clear to anyone skilled in the art, which sound waves and/or electromagnetic radiation can be used in the present invention. Although a combination of sound waves and electromagnetic radiation can be used in the present invention, the power input required will generally be so low that a single apparatus suffices. Therefore, it is generally preferred to use either sound waves or electromagnetic radiation.

Electromagnetic waves which have been found especially suitable for use in the present invention, comprise waves in the microwave region. Electromagnetic waves which are preferred for use in the present invention comprise electromagnetic waves having a wave length between 1 mm and 30 cm. Their frequency is from 300 GHz to 1 GHz. A source of electromagnetic waves which is readily available, are microwave ovens.

Preferably, the DMC catalyst is treated with sound waves. As mentioned above, sound waves include not only waves having a frequency which can be heard, but also waves having either a higher or a lower frequency. Further, the DMC catalyst can be treated with waves via liquid and/or via gas. It will be appreciated that the catalyst can be treated during preparation as a catalyst slurry.

Sound waves which have been found to be especially suitable, are ultrasonic waves. More specifically, we found that sound waves having a frequency of at least 15 kHz, more specifically at least 18 kHz, most specifically at least 20 kHz, are especially suitable for use in the present invention.

The power input by the sound waves and/or electromagnetic radiation, depends on the specific circumstances such as the amount of catalyst present. Generally, 50 grams of a slurry containing of from 1 to 5% wt of catalyst will be subjected to a source giving pulses having a power of between 100 and 1000 W during of from 1 to 15 minutes.

It has been found especially advantageous if the time lapsed between treating the DMC catalyst with sound waves and/or electromagnetic radiation is not too long. Preferably, the time lapsed between treating the DMC catalyst and use of the DMC catalyst in the process, is at most one week. More preferably the time lapsed between treating the DMC catalyst and use of the DMC catalyst is at most 3 days, more specifically at most 2 days, most specifically at most 1 day.

An embodiment which is especially attractive is treating the DMC catalyst while the catalyst is being transported to the reactor.

Polymerization of alkylene oxides is typically carried out by reacting a mixture of hydroxyl group-containing initiator with DMC catalyst at a temperature of from 80 to 150° C., more particularly from 90 to 130° C. at atmospheric pressure. Higher pressures may also be applied, but the pressure will usually not exceed 20 bar and preferably is from 1 to 5 bar.

Preferred alkylene oxides for use in the present invention are ethylene oxide, propylene oxide, butene oxides, styrene oxide, and the like, and mixtures thereof.

A wide range of initiators can be used in the process according to the present invention. Initiators which are generally used are compounds having a plurality of active hydrogen. Preferred initiators include polyfunctional alcohols, generally containing 2 to 6 hydroxyl groups. Examples of such alcohols are glycol, such as diethylene glycol, dipropylene glycol, glycerol, di- and polyglycerols, pentaerythritol, trimethylolpropane, triethanolamine, sorbitol and mannitol.

The DMC catalysts of the invention are very active and hence exhibit high polymerisation rates. They are sufficiently active to allow their use at very low concentrations, such as 25 ppm or less. At such low concentrations, the catalyst can often be left in the polyether polyol without an adverse effect on product quality. The ability to leave catalysts in the polyol is an important advantage because commercial polyols currently require a catalyst removal step.

The process according to the invention can be used to make homopolymers, random copolymers or block copolymers.

Polyether polyols prepared using the DMC catalyst prepared in accordance with the present invention have a very low unsaturation, namely consistently less than about 0.007 meq/g and even less than 0.005 meq/g. Such low unsaturation offers advantages for polyurethanes made with the polyols of the invention.

Polyether polyols made with the catalysts of the invention suitably have a nominal average functionality of from 2 to 8, more suitably from 2 to 6. The polyols may have a number average molecular weight up to 50,000, but typically the molecular weight is within the range of 500 to 12,000, more typically from 2,000 to 8,000.

Additionally, the present invention relates to the treating a DMC catalyst with sound waves and/or electromagnetic radiation.

In a final aspect the present invention also relates to DMC catalyst which has been treated with sound waves and/or electromagnetic radiation.

DMC catalyst which has been treated with sound waves and/or electromagnetic radiation will generally contain relatively small particles. The DMC catalyst obtained can contain at least 60% wt of particles having a size of at most 0.1 micrometer.

The invention will be further illustrated by the following examples, however, without limiting the invention to these specific embodiments.

EXAMPLE 1

Preparation of DMC Catalyst

Procedure A: A solution containing 30 grams of zinc chloride, 195 ml water and 117 grams of tert-butyl alcohol (117 grams) was added to a one liter glass reactor equipped with a mechanical stirrer. An aqueous solution of potassium hexacyanocobaltate (12 grams in 225 ml water) was added under stirring in 30 minutes. Stirring was continued for another 30 minutes and the mixture was allowed to stand overnight resulting in a viscous, white coloured, stable dispersion of DMC complex particles in a water/tert-butyl alcohol phase.

Procedure B: To the dispersion obtained after Procedure A was added methyl tert-butyl ether (70 grams) under stirring. Stirring was continued for another 5 minutes. After the stirring had stopped two distinct layers were formed: a highly viscous, white coloured upper layer and a transparent, water-thin, bottom layer. After draining the bottom layer (337 grams), 337 grams of a 25/75 m/m tert-butyl alcohol/water was added under stirring. After stirring for an additional 5 minutes followed by settling during 30 minutes the transparent bottom layer was drained again. This layer had a mass of 355 grams. Subsequently, 355 grams of a 25/75 m/m mixture of tert-butyl alcohol and water was added together with 15 grams of methyl tert-butyl ether under stirring. After stirring for an additional 5 minutes followed by settling during 30 minutes the transparent bottom layer was drained again. The drained layer had a mass of 308 grams. Then, 308 grams of tert-butyl alcohol was added under stirring followed by 240 grams of a propylene oxide adduct of glycerol having a number average molecular weight of 670 Dalton (G670). After stirring for a further 30 minutes the tert-butyl alcohol and residual water were removed by stripping under reduced pressure (300 mbar) at 60° C. until the water content of the DMC/G670 mixture was less than 0.5 wt %.

The product was a highly viscous, stable, white coloured dispersion containing 5 wt % DMC catalyst particles dispersed in G670.

EXAMPLE 2

Polyol Preparation

A one liter mechanically stirred reactor was charged with 89.0 grams of G670 and 0.24 gram of the DMC catalyst dispersion prepared in Example 1 containing 12 milligram DMC catalyst. This mixture was treated for 5 minutes with sound wave pulses, which sound waves had a frequency of 20 kHz. The power of the source of the sound waves was 100 W. Immediately afterwards 311 grams of propylene oxide was added in 134 minutes. After this addition, 388 grams of propylene oxide and 12.4 grams of glycerol were added in 2 hours.

The propylene oxide polyol obtained had a hydroxyl value of 54.6 mg KOH/g, an unsaturation of 0.005 mmol/gram and a number average molecular weight of 2241.

The propylene oxide concentration in the liquid phase at the end of the reaction was 0.3% wt.

The concentration of propylene oxide in the liquid phase at the end of the reaction is a measure for the activity of the catalyst employed. The lower the propylene oxide concentration at the end of the reaction, the more active the catalyst has been.

COMPARATIVE EXAMPLE 1

A one liter mechanically stirred reactor was charged with 89.6 grams of G670 and 0.24 gram of the DMC catalyst dispersion prepared in Example 1 containing 12 milligram DMC catalyst. Subsequently, 311 grams of propylene oxide was added in 142 minutes. After this addition, 388 grams of propylene oxide and 12.4 grams of glycerol were added in 2 hours.

The propylene oxide polyol obtained had a hydroxyl value of 55.9 mg KOH/g, an unsaturation of 0.006 mmol/gram and a number average molecular weight of 2323.

The propylene oxide concentration in the liquid phase at the end of the reaction was 0.6% wt.

The invention claimed is:

1. A catalyst comprising a double metal cyanide complex catalyst which catalyst has been treated with sound waves having a frequency of at least 20 kHz and/or electromagnetic radiation in the microwave region.

2. The catalyst of claim 1, in which the catalyst comprises zinc hexacyanocobaltate.

3. The catalyst of claim 1, in which the catalyst exhibits a powder x-ray diffraction pattern exhibiting no detectable signals corresponding to highly crystalline zinc hexacyanocobaltate at about, d-spacing, angstroms, 5.07.

4. The catalyst of claim 1, in which the catalyst exhibits a powder x-ray diffraction pattern of, d-spacing, angstroms: 4.82 (br), 3.76 (br) and exhibits no detectable signals corresponding to highly crystalline zinc hexacyanocobaltate at about, d-spacing, angstroms: 5.07, 3.59, 2.54 and 2.28.

5. The catalyst of claim 1, in which a complexing agent which forms the complex of the double metal cyanide complex catalyst is one or more compound selected from the group consisting of ethanol, isopropyl alcohol, tert.-butyl alcohol, sec-butyl alcohol, n-butyl alcohol, and isobutyl alcohol.

6. The catalyst of claim 1, in which the catalyst has the formula:

wherein C is a complexing agent, n is from 0 to 10, and A is a compound of general formula (I), and p is from 0 to 10

wherein:
- $R^1$ represents hydrogen, an aryl group, a substituted or unsubstituted $C_1$–$C_{10}$ alkyl group or $R^3$—NH—,
- $R^2$ represents hydrogen, an optionally halogenated $C_1$–$C_{10}$ alkyl group, $R^3$—NH—, —$R^4$—C(O)O—$R^5$ or a cyanide group,
- $R^3$ represents hydrogen or a $C_1$–$C_{10}$ alkyl group,
- $R^4$ represents a substituted or unsubstituted alkylene group having 2 to 15 carbon atoms,
- $R^5$ represents hydrogen, a substituted or unsubstituted $C_1$–$C_{10}$ alkyl group, and m and n' independently are 0 or 1.

7. The catalyst of claim 1, in which the catalyst has been treated with sound waves having a frequency of at least 20 kHz.

8. The process of claim 1, in which the catalyst has been treated with electromagnetic radiation in the microwave region.

9. The catalyst of claim 1, in which the catalyst has been treated with electromagnetic waves having a wave length between 1 mm and 30 cm, and a frequency of from 300 GHz to 1 GHz.

10. The catalyst of claim 1, wherein at least 60% wt of the catalyst has a particle size of at most 0.1 micrometer.

* * * * *